Dec. 18, 1934.   E. S. BUSH   1,985,016
REDUCTION GEAR
Filed Aug. 27, 1932   3 Sheets-Sheet 1
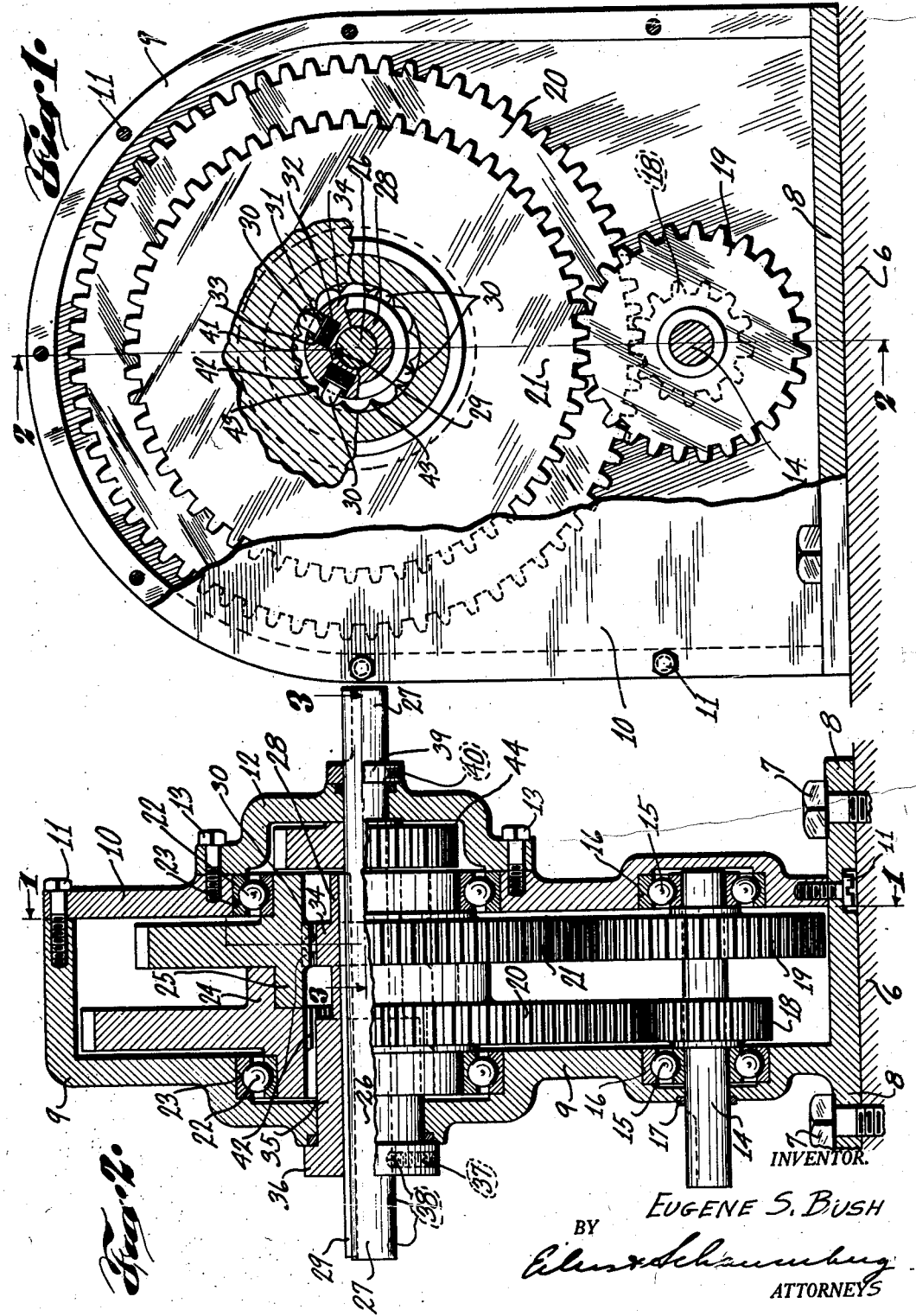
INVENTOR.
EUGENE S. BUSH
BY
ATTORNEYS Dec. 18, 1934.  E. S. BUSH  1,985,016
REDUCTION GEAR
Filed Aug. 27, 1932  3 Sheets-Sheet 2
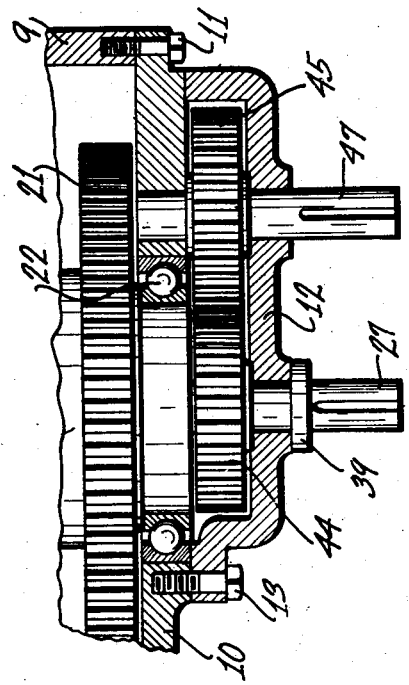
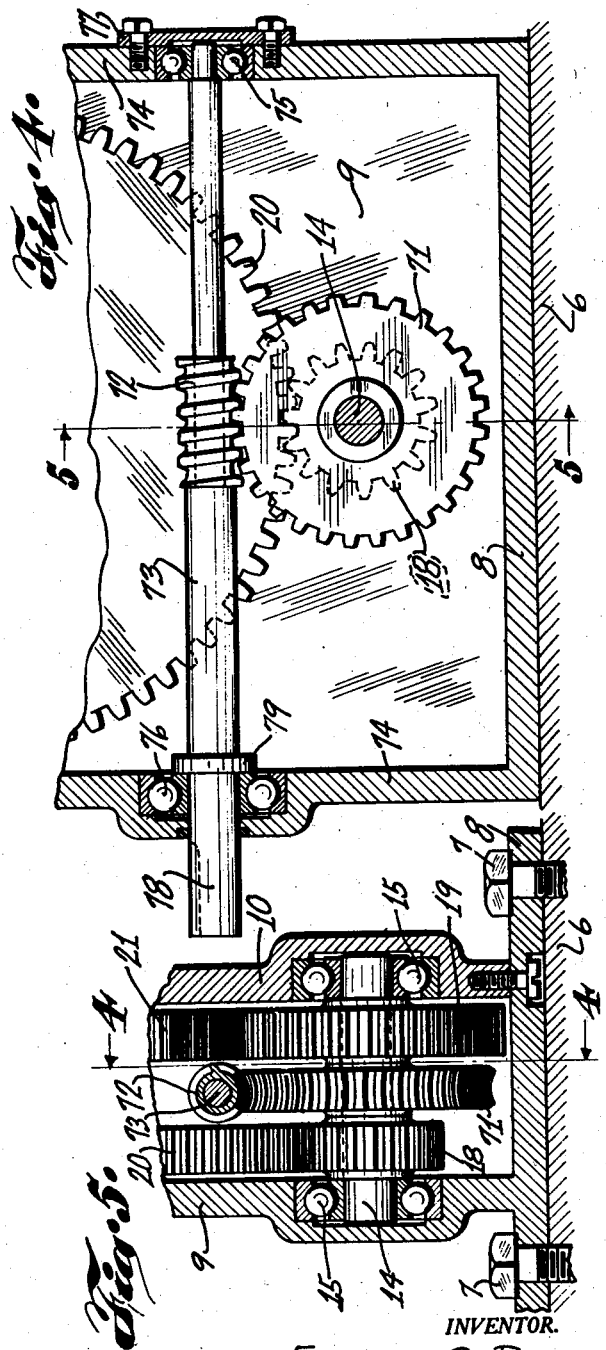
INVENTOR.
EUGENE S. BUSH
BY
ATTORNEYS Dec. 18, 1934.  E. S. BUSH  1,985,016
REDUCTION GEAR
Filed Aug. 27, 1932  3 Sheets-Sheet 3
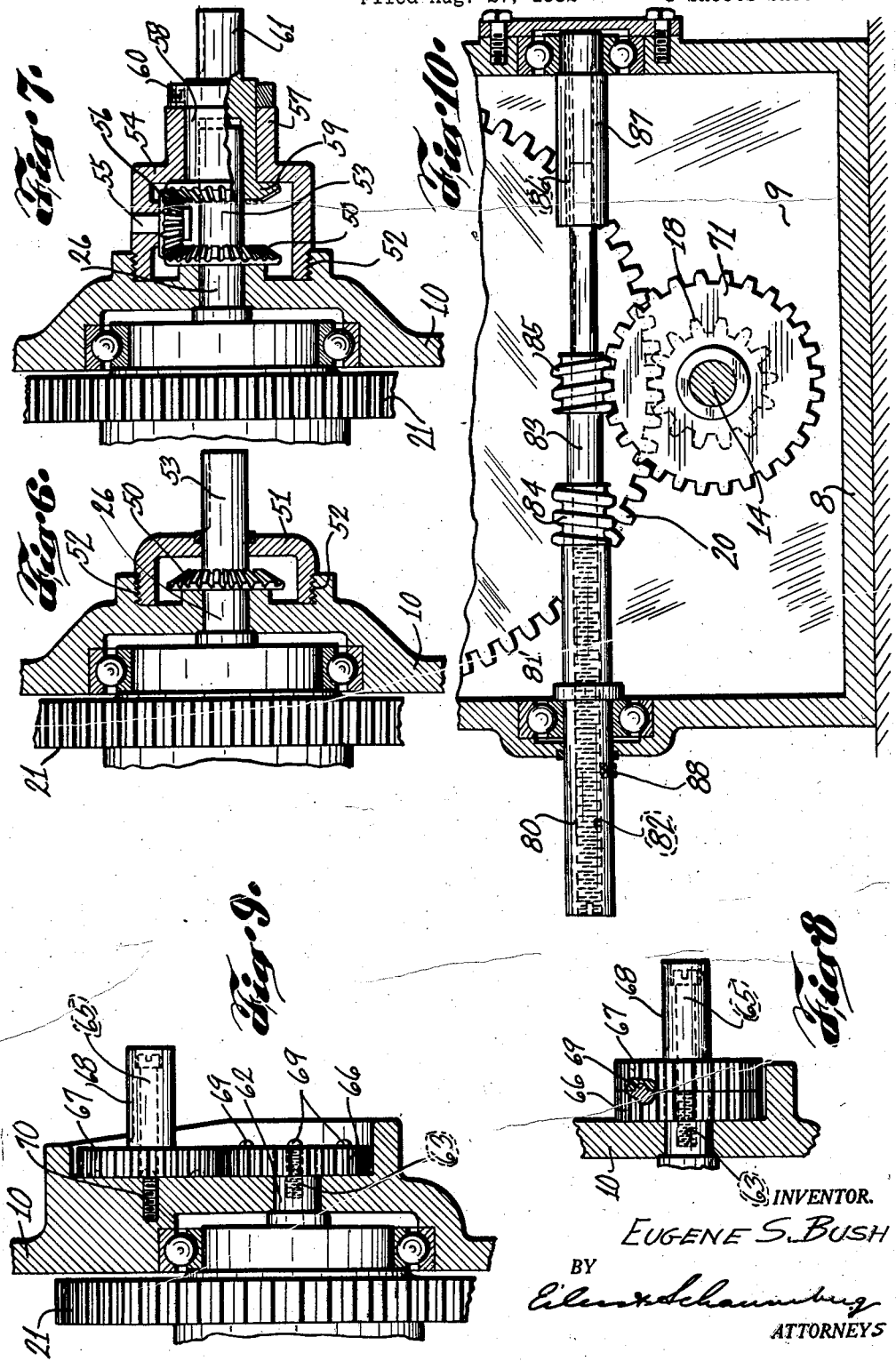
INVENTOR.
EUGENE S. BUSH
BY
ATTORNEYS Patented Dec. 18, 1934

1,985,016

UNITED STATES PATENT OFFICE 1,985,016

REDUCTION GEAR

Eugene S. Bush, St. Louis, Mo., assignor to Bush Manufacturing Company, St. Louis, Mo., a corporation of Missouri Application August 27, 1932, Serial No. 630,614

6 Claims. (Cl. 74—11)

This invention relates to improvements in gearing assemblies, and more particularly to improvements in the construction of gearing of the type popularly known as reducing or reduction gears.

An object of the invention is to provide a reduction gear assembly of a type to afford, consistent with minimum dimensions and space requirements, a plurality of different reducing-gear ratios.

A further object of the invention is attained in a reduction gear assembly providing a plurality of selectable gear ratios, the construction and arrangement being such that the space requirements are not materially greater than in units of heretofore prevailing type, for a comparable purpose, and affording only a single, fixed reduction ratio.

Another object of the invention is to provide a light weight, compact and easily portable reduction gear unit of a type particularly adapted for the driving of apparatus of low torque requirement.

Yet another object of the invention is attained in a reduction gear conforming substantially in dimensions to those of heretofore previling type and in which is provided, besides selectable ratios, a reversing power take-off expedient.

A still further object of the invention is attained in a reduction gear providing a plurality of reducing ratios, and a unique driving connection to a power take-off shaft, such connection embodying an automatic overload release.

A still further object of the invention is attained in a novel form of gear and shaft connection, adaptable generally to power transmission gearing for the actuation of apparatus of relatively low torque requirement.

The foregoing and still further objects will more fully appear from the following detailed description of preferred embodiments of the invention, considered in connection with the accompanying drawings thereof, and in which:

Fig. 1 is a vertical sectional elevation, certain parts being broken away to reveal features internal of the assembly; Fig. 2 is a vertical section of the assembly shown in Fig. 1, and as viewed along line 2—2 thereof; Fig. 3 is a fragmentary horizontal sectional elevation taken along line 3—3 of Fig. 2; Fig. 4 is a fragmentary vertical sectional elevation as viewed along a vertical plane extended longitudinally of the assembly, the location of the plane of reference being indicated by line 4—4 of Fig. 5; Fig. 5 is a fragmentary vertical transverse section as viewed along line 5—5 of Fig. 4, Figs. 4 and 5 illustrating a structure embodying optional additions to the structure of Figs. 1 and 2; Figs. 6 and 7 are fragmentary vertical sections, showing a provision for a detachable reverse gearing assembly, in Fig. 6, the mechanism being equipped for normal rotation, and in Fig. 7, for reverse rotation; Figs. 8 and 9 show a still further modified form of reverse gearing assembly, as arranged respectively for forward or normal, and for reverse rotation, and Fig. 10 is a view similar to Fig. 4, showing a modification of the worm gear drive.

Referring now by numerals of reference to the drawing, the assembly is conveniently mounted on a base 6, which may consist for lightness, of an element of wood, and to which detachable securement of a housing for the assembly is conveniently effected by bolts 7 extending through apertures therefor in base flanges 8, projected laterally of the housing or casing for the reducing gear. The casing consists in the example shown, of an open side, hollow structure 9, the opening of which is provided with a closure plate 10 secured to the structure 9, as by screws 11. Projecting outwardly or laterally of the plate 10, is a hollow gear-enclosing bearing member 12, secured in place over a central opening in the plate 10, as by screws 13.

According to the structure of Figs. 1 and 2 there is provided at 14, a drive shaft extending transversely of the case. The shaft 14 is journalled near its opposite ends in the portions 9 and 10, preferably, but not necessarily, through the use of anti-friction bearings, the assemblies of which are indicated at 15, and the inner races of which are preferably pressed in position on the shaft 14. The outer races of the ball bearing assemblies are shown as snugly occupying recesses 16 therefor, the shaft 14 projecting laterally of at least one side of the casing 9—10, to receive a power pulley (not shown). Preferably only one side of the casing is apertured to receive a projecting portion of shaft 14, the opposite side being thus kept fluid-tight so as to minimize any tendency for escape of lubricant from a splash-oiling lubricant supply, provided internally of the casing 9—10. A felt washer 17 is disposed preferably as shown, in wiping engagement with the shaft 14, and the escape of lubricant thus minimized at this location.

The shaft 14, in the examples shown, is provided with a smaller gear 18 and a larger gear 19, both of which are keyed or otherwise suitably secured to the shaft 14, these gears being spaced apart so as to leave therebetween an opening, for purposes hereinafter appearing in connection with the description of the modified form of Figs. 4 and 5.

The gears 18 and 19 respectively mesh with gears 20 and 21, spaced similarly to the gears 18 and 19 and so aligned therewith. The gears 20 and 21 are primarily journalled, as through the interposition of anti-friction or ball bearings such as 22, disposed within pockets 23, formed by recesses or openings within the portions 9 and 10 of the housing. The inner races of the bearing assemblies 22 each engage a lateral annular projection, or hub, one on gear 20, and the other on the gear 21. The gears 20 and 21 are further provided with inwardly and oppositely projecting, telescoping journal portions shown at 24 on the gear 20, and at 25 on the gear 21, the parts 24 and 25 constituting portions of the gear hubs. The arrangement of the portions 24 and 25 is such that the gears are kept in positive parallelism, with their axes always in alignment, for a purpose hereinafter appearing.

Disposed axially of the gears 20 and 21 is a driven shaft 26, having end portions 27 projected from one or both sides of the case or housing 9—10. Splined or keyed to the shaft 26 for rotative movement therewith, but permitted longitudinal movement relative thereto, is a hollow shaft or sleeve 28, the connection thereof with shaft 27 being made as through a key member 29. Carried by a sleeve 28, as best shown in Fig. 1, are a plurality of radially arranged plungers 30, each of such plungers being characterized by a rounded outer end or terminal, a disc base 31, against which bears a compression spring 32, the plunger and spring assembly being disposed in a radial well therefor, shown at 33. While it is preferred to provide a plurality of the wells 33 and several of the spring-pressed plunger assemblies, only one thereof will be seen to fulfill the requirements of an operative structure according to the prevailing requirements.

The sleeve or hollow shaft structure 28 is provided with an intermediate annular projection 34, (Fig. 2) in which the plungers and wells are located. A similarly projecting portion 35, say of even diameter with 34, is provided on the sleeve 28 and projects to a point exterior of the housing 9—10 where it terminates in a collar portion 36, provided with a recessed set screw 37 through which, for a purpose later appearing, the sleeve 28 may be secured at selected positions along the shaft 26. To pre-establish fixed positions of setting of the sleeve with respect to the shaft 27, recesses 38 may be provided.

It is contemplated that the shaft 26 remain in constant axial relation to the housing or casing 9—10. To the end of permitting rotation of the shaft while maintaining its axial position a collar 39 may be provided, a set screw 40 serving for securement thereof to the shaft.

As will have appeared heretofore, the driving connection between the gears 20 and 21, and the shaft 26, is selectively established through the plungers 30. Coacting therewith, there being one in each of the gears 20 and 21, is a plunger seat 41, machined from a central aperture of each of the gears 20 and 21. The plunger seats 41 are each characterized by contiguous channels of curved section disposed in parallel adjacence to each other and of a trend along the axis of the gear in which they are formed. The adjacent grooves 42 are joined by attenuate ridges or walls 43, thus presenting in cross section, a scalloped internal periphery of the gear opening, the grooves 42 being preferably curved on such a radius as to conform somewhat to the radius of curvature of the rounded ends of plungers 30. These plungers may be, as shown, of circular or cylindrical conformity but may, where the device is employed for somewhat heavier service, be of rectangular or oblong section, so as to bear over the entire length of one of the grooves 42 and hence over the thickness of the gear.

The power take-off shaft 26 may be provided at one of its outer extremities 27 with a power pulley (not shown). However, according to some conditions of service it may be desirable to provide for actuation of a power take-off shaft in either clockwise or anti-clockwise rotation. To this end there are provided a pair of gears 44 and 45 (Fig. 3), carried within a pocket or hollow extension therefor such as shown at 12, formed as a part of, or secured to the closure plate 10 of the housing. According to this construction the gear 44 is secured directly to the shaft 26. The gear 45, meshed with the gear 44, is carried by a stub shaft 47 and journalled on opposite sides of the gear in the plate 10 and in the extension 12, projecting beyond the extension to provide a pulley receiving portion, always obviously rotating oppositely of the adjacent end 27 of shaft 26.

A somewhat preferable, detachable reversing gear expedient is shown by Figs. 6 and 7, according to which the shaft 26 is prevented from axial displacement by a bevel gear 50, secured to the shaft as by a set screw or the like, (not shown). In case the purchaser of the reduction gear desires only the normal or forward rotation of the power take-off shaft, an exteriorly threaded, cup-shaped housing 51, is secured as by threads 52 to the closure plate 10 or a detachable extension thereof. The shaft end 53 projecting outwardly through a central aperture in the member 51, serves to receive a pulley, connection for which is provided as by a keyway. If it be desired at the time of purchase, or thereafter, to alter the direction of rotation of the power shaft, a somewhat extended housing portion 54 is substituted for the element 51, as indicated by Fig. 7, it being observed that the housing 54 is exteriorly threaded so as to engage, without special tools, the threads 52. Mounted within the housing 54, about a pivot pin 55 at a right angle to the shaft is a pinion 56, brought into bevel gear relation with the gear 50 when the housing portion 54 is threaded into place. Journalled within this auxiliary housing, particularly within an extension or hub 57 thereof, is a stub shaft 58, recessed at one end to receive the otherwise projecting end of shaft 26. At the inner end of the shaft 58 is a bevel gear 59, ordinarily of the same type and pitch as gear 50, and similarly but reversely related to the pinion 56. The gear 59 and a collar 60 serve to position the shaft section 58 axially of the assembly, and an end projection 61 serves to receive a pulley, gear, sprocket, or other power connection. It will appear clearly from the drawings, that the addition of pinion 56 and gear 59 results in the shaft end 61 rotating in a direction opposite to that of the shaft 26, and thus providing a quick-detachable, reversing power take-off expedient.

A further modified reversing expedient, appears in Figs. 8 and 9, a cover portion being omitted for brevity of description, and clearness of these figures. According to this construction, the power take-off shaft 62 is provided with a tapped recess 63, to receive a screw 65, a gear 66 being, for example, pressed on to the end of shaft 62. In case normal or forward rotation of the power pulley is desired, paired gears 66 and 67 are co-axially mounted as shown in Fig. 8, the gear 67 being attached to gear 66 and the shaft 62 as by the screw 65, projecting through a hub portion 68 on which the pulley may be mounted. In this relation of gears 66 and 67 are locked together through the provision of one or more projections 69 on one of the gears, each of which engages a corresponding recess therefor in the other gear. In case it is desired to provide for reverse rotation, the gears are arranged as shown in Fig. 9. The gear 67 is then mounted in mesh with the gear 66 and the screw 65 extended through the hub 68 into a tapped opening 70 in the case closure 10, or an extension thereof. It will be seen that when the parts are disposed as shown in Fig. 8, the usual forward or normal rotation of the hub 68 is provided, whereas when the gears are disposed as in Fig. 9, the power take-off 68 will, other conditions remaining the same, be oppositely rotated.

The operation of the gear trains internal of the assembly as thus far described, is thought to have appeared from the description of parts, but in a brief review thereof it may be noted that, as shaft 14 is driven as by a belt, or by direct connection with a prime mover, for example, an electric motor, gears 18 and 19 rotate therewith, and at a reduced rate, gears 20 and 21. The latter gears obviously rotate at different speeds, thereby affording different reduction ratios. It will have appeared that the gears 20 and 21 are journalled independently of the shaft 26 and are always in constant mesh with the gears 18 and 19, no shifting of gears, as such, being necessary to a choice of the selective ratios afforded. Since, in the example illustrated, there is only one set of the plungers 30, these being carried by the portion 34 of hollow shaft 28, selection of reduction ratios is effected by changing the axial setting of the hollow shaft or sleeve 28, by disposing the set screw 37 in one of the recesses 38 therefor. Three such recesses are provided, so as to determine a neutral or disengaged setting of the plunger head 34. With the parts in the position of Fig. 2, driving takes place through shaft 14, gear 19, gear 21, the plunger seat 41 in gear 21, thence through the plungers 30 to the sleeve 28. The sleeve being keyed or splined to the shaft 26, is in direct driving connection therewith. The power take-off location is determined upon, according to the desired direction of operation, either through shaft end 27 or shaft 47; shafts 53 or 61, or the hub 68, according to the type of reversing gear employed.

In case it is desired to change to a lower gear ratio and hence to provide a greater reduction of speed of the driving shaft 14, set screw 37 is released and the sleeve 28 moved longitudinally so as to bring the plungers 30 within the plunger seat of gear 20. After this shift, the sleeve 28 and shaft 26 are driven at a rate determined by the reduction afforded through gears 18 and 20.

Certain conditions of service and attendant space requirements, render advisable the location of the power in-put on the end, provide a so-called right angle assembly, rather than on the side, as in the case of a parallel assembly, as shown in Fig. 2. Under such conditions, and in case a still greater speed reduction is required than that afforded by the assembly of Fig. 2, there is disposed on the shaft 14, a worm gear 71 (Fig. 4) which may be keyed or otherwise secured, in the example shown, centrally of the encased portion of the shaft 14. The worm gear 71 is enmeshed with and driven by a worm 72 carried by a worm shaft 73. Journalled at its opposite ends in the end walls 74 of the housing portion 9, anti-friction means such as ball bearings 75 and 76 are provided, the end walls being recessed to accommodate the bearings, or apertured and provide with a closure plate 77, so as to permit access to, and prevent escape of oil from, the bearing and bearing aperture. The worm shaft 73 projects endwise of at least one of the end walls 74 to form a pulley-receiving portion 78, utilized for power input purposes according to the arrangement of Figs. 4 and 5. The location of the worm and worm gear between the gears 18 and 19, as will be noted, does not increase the space requirements over those of the structure shown by Fig. 2, the space between gears 18 and 19, as well as 20 and 21, being determined according to the width of gear flanges or journal portions 24 and 25. According to the modification shown by Figs. 4 and 5, it is possible through the augmented reduction afforded by the worm and worm gear, to obtain, in a very compact unit, speed reductions of the order of several hundred to one.

To the end of caring for thrust incident to the worm and worm gear, a thrust collar such as 79 may be provided on the shaft 73, and one of the ball bearing assemblies may be of a type adapted to serve as a thrust bearing in coacting with the thrust collar.

The operation of the modification constructed according to Figs. 4 and 5 is identical with that of the structures of Figs. 1 and 2 except that the shaft 14, instead of being directly driven by the prime mover is driven by the worm gear 71 which, in turn, is driven through the worm by shaft 73.

A modified arrangement of the worm and worm shaft structure is shown by Fig. 10, embodying a built-up shaft carrying paired worms of opposite pitch. In this structure the relation of the shaft to the walls of the casing, the bearings, etc., may be identical with the corresponding parts of the arrangement shown in Fig. 4. The built-up shaft of Fig. 10 includes a tubular, internally tapped shaft section 80 provided with a thrust collar 81. Threadedly engaging the bore of shaft 80 is an elongate screw 82 axially secured to, or formed as a part of a shaft section 83 carrying, in spaced relation, a left hand worm 84, and a right hand worm 85. A portion of the section 83 extends beyond the worm 85 and is provided with a key-way or groove to engage a key or spline 86 within a hollow stub shaft section 87, at the opposite or outer end of the structure. In service, the operation of the double worm shaft is identical with the arrangement of Fig. 4. It will be seen, however, that the arrangement of Fig. 10 provides for reversal of either of the selected gear trains 18—20 or 19—21, and may be utilized either in lieu of, or in combination with, any of the reversing arrangements of Figs. 3, 7 or 9. It being assumed that, with the worm 85 operating the worm gear 71, forward or normal rotation results, a reverse rotation may be effected by bringing the worm 84 into mesh with the worm gear 71. This is accomplished by releasing a set screw 88, and actuating the screw 82 in a direction to rotate the shaft section 83 relative to the section 80, causing the worm 85 to advance to the right, (Fig. 10), and the worm 84 correspondingly to be moved along the axis of the shaft until it is threaded into mesh with the gear 71. In this position the inoperative worm 85 abuts the end face of shaft 87 and so tends to position the shaft sections against endwise displacement. Reverse actuation of the screw 82 again serves to restore the worm 85 to operative connection with the worm gear 71. When the desired setting is obtained, the set screw 88 is threaded up so as to prevent accidental unthreading of the screw 82. Suitable means (not shown), are preferably provided to indicate, at points exterior of the case, the meshing positions of the worms.

It will appear as a distinct advantage, from a production view point that, through the selective use of the worm and worm gear assembly, a great variety of reduction ratios may be obtained in otherwise substantially standardized apparatus. An advantage results to the user in that the speed reducers now available to the trade are restricted to, and manufactured for only a single ratio of reduction. The user of devices of the present order is enabled to select in a few moments, either of two ratios of speed reduction. Without a materially increased investment there may be selectively employed the worm and worm gear arrangement through the addition and removal of which four different ratios are possible.

Devices of the present type are particularly in demand for the driving of moving displays, such as motion devices for advertising, to mention only one of numerous applications of the apparatus. It will appear as a distinct advantage, besides the variety of reduction ratios afforded, that the present general form of connection, found herein in the plungers 30 and plunger seats 41, provides an automatic safety overload release. If, for example, the driven mechanism becomes jammed or inoperative for any reason, and there results a loading that would otherwise tend to injure the prime mover such as a motor, continued rotation of one of the gears, such as 21, will serve to notch the adjacent plunger-seating grooves 42 past the plungers 30, with the effect of alternately depressing and releasing the plungers, and thus precluding any destructive effects on either the driving or driven equipment. This expedient, while providing a freely shiftable connection between the gears 20 and 21 or any desired reasonable plurality of such gear trains, permits an increased use of positive connections to and from the shafts 14, 78, 27, etc., thus obviating many of the space-consuming belt connections formerly thought necessary for safety release purposes.

It will also appear that, while I have referred to certain of the shafts with particularity, in the selected example, as driving or driven members, obviously, the device may, in case the worm gear is omitted or the worm and worm gear re-arranged, be utilized as a speed increaser, applying power say to the shaft end 27, and utilizing as a power take off member, the shaft 14.

It will appear that in addition to the advantages discussed, the compactness, simplicity of construction and standardization of most of the parts of the assembly, serve more than fully to attain the several objects above set forth. The foregoing disclosure has described in detail certain preferred embodiments; such description is, however, not to be understood in a limiting sense, since numerous variations may be made in the parts, combinations and arrangement, all within the scope of the invention as defined by the claims hereunto appended.

I claim:

1. In a reduction gear unit, a housing, spaced gear trains providing selective reduction ratios, a plurality of shafts, each common to corresponding gears of the said trains, a worm and worm gear in operative relation to one of said shafts, and disposed between the gears of said trains, a member movable along the other of said shafts for selectively connecting said shaft to its associated gears, an overload-releasing device associated with said connecting members, bearings for the last named gears, by which said gears are mounted for rotation within portions of the housing and upon each other, independently of the associated shaft and connecting member, certain of said bearings projecting laterally of the gears and serving as spacing elements therebetween.

2. In a reduction gear unit, a housing, spaced gear trains therein, providing selective reduction ratios, a shaft common to corresponding gears of the said trains, a worm and worm gear in operative relation to said shaft and disposed between the gears of said trains, a power take-off shaft coaxial with certain of the gears of said trains, and adapted to be driven selectively through said gear trains, bearings for the last said gears, through which the gears are journalled entirely upon each other and the walls of the housing, certain of said bearings being formed as lateral projections on the gears, and serving as spacers therebetween, and a device for selectively connecting said take-off shaft to said gear trains, said device including releasably interengaging shaft- and gear-connecting elements.

3. A reduction gearing unit including a shaft, a pair of gear trains of different ratio operatively related to, and spaced axially of said shaft, a worm gear on said shaft, a worm and worm shaft located substantially between the gear trains, a second shaft adapted to be driven selectively from one gear of each of said trains, combined journal and spacer elements on each of the last said gears, a sleeve movable axially of said second shaft, but rotatively secured thereto, elements carried exteriorly of the sleeve and internally of the gears associated with said second shaft, said elements constituting a gear clutch, the clutch elements including spring means tending to urge the elements into interengaging relation, and adapted to permit relative movement of the clutch elements in response to overload conditions.

4. A reduction gearing unit including a shaft, a pair of spaced gear trains of different ratio operatively related to said shaft, a second shaft adapted to be driven selectively from one gear of each of said trains, a sleeve slidably carried by the second shaft, radially arranged plungers carried by the sleeve, plunger seals internally of the gears associated with the sleeve, spring means urging the plungers into interengaging relation with the seals, and adapted to permit relative movement of the plungers and seals in response to overload conditions, a worm gear on the first said shaft, a worm and worm shaft coacting therewith, the worm, worm gear and worm shaft being disposed between the planes of the gear trains, said unit including a case, and bearings, carried by said case, for the gears associated with said sleeve and second shaft, the sleeve together with certain of the gear clutch elements, being arranged for axial movement, whereby to permit operative selection of said gear trains.

5. A reduction gearing unit including a case, a shaft, a plurality of gear trains of different ratio operatively related to said shaft, the gear trains being spaced to receive a worm and worm-gear therebetween, a second shaft adapted to be driven selectively from one gear of each of said trains, a sleeve movable axially of said second shaft, but rotatively secured thereto, radially movable plunger elements yieldably mounted exteriorly of the sleeve and plunger-receiving seals located internally of the gears associated with said second shaft, said elements and seals constituting a gear clutch, the clutch elements being relatively positioned to permit their displacement in response to overload conditions, bearings for the gears associated with the second shaft, said bearings being carried by the case independent of said shafts and sleeve, whereby to permit free axial movement of the sleeve incident to its gear-selecting actuation, and interengaging journal portions projecting laterally of the adjacent gears associated with the said second shaft, and serving to space said gears and trains.

6. A speed change unit including a casing, a shaft, two spaced trains of gears operatively related to said shaft, a second shaft adapted to be operatively associated with gears of the different gear trains, one at a time, a sleeve movable axially of said second shaft and rotatively secured thereto, a plurality of radially arranged plungers carried by the sleeve and plunger seals internally of the gears, coacting with the plungers to constitute a gear clutch, springs tending to urge the plungers into interengaging relation with the seats, and permitting their displacement responsively to overload conditions, bearings for the said gears, carried by the casing, independent of the shafts and sleeve, interengaging journal portions carried by, and serving to space the gears associated with said second shaft, means for securing the said sleeve to the associated shaft, seats on said shaft for the sleeve securing means, said seats being located to define predetermined sleeve and gear-clutch positions.

EUGENE S. BUSH.